United States Patent [19]

Hayashi

[11] 4,302,287
[45] Nov. 24, 1981

[54] NUCLEAR REACTOR OPERATION CONTROL PROCESS

[75] Inventor: Hiroshi Hayashi, Tokyo, Japan

[73] Assignee: Hitachi, Ltd., Tokyo, Japan

[21] Appl. No.: 884,571

[22] Filed: Mar. 8, 1978

[30] Foreign Application Priority Data

Mar. 9, 1977 [JP] Japan ................................. 52-25795

[51] Int. Cl.³ ............................................... G21C 9/00
[52] U.S. Cl. ...................................... 376/217; 376/410
[58] Field of Search ............. 176/19 R, 19 LD, 20 R, 176/21, 22, 24, 38, 50

[56] References Cited

U.S. PATENT DOCUMENTS 4,057,466 11/1977 Thompson ...................... 176/19 R Primary Examiner—Donald P. Walsh Attorney, Agent, or Firm—Craig and Antonelli

[57] ABSTRACT

A method for controlling the operation of a nuclear reactor to increase the reactor power in a range in which pellet-clad-mechanical-interaction occurs. The method includes the steps of increasing the reactor power from a power level in which pellet-clad-mechanical-interaction begins to take place up to a predetermined power level for the nuclear reactor and controlling the rate of increase of the linear heat generating rate. The rate of increase is controlled with at least one of a rate no less than 0.15 KW/ft/hr., and a rate no greater than a predetermined critical rate so as to shorten the time necessary to raise the reactor power to the predetermined power level without causing pellet-clad-mechanical-interaction damage to the fuel elements.

11 Claims, 12 Drawing Figures

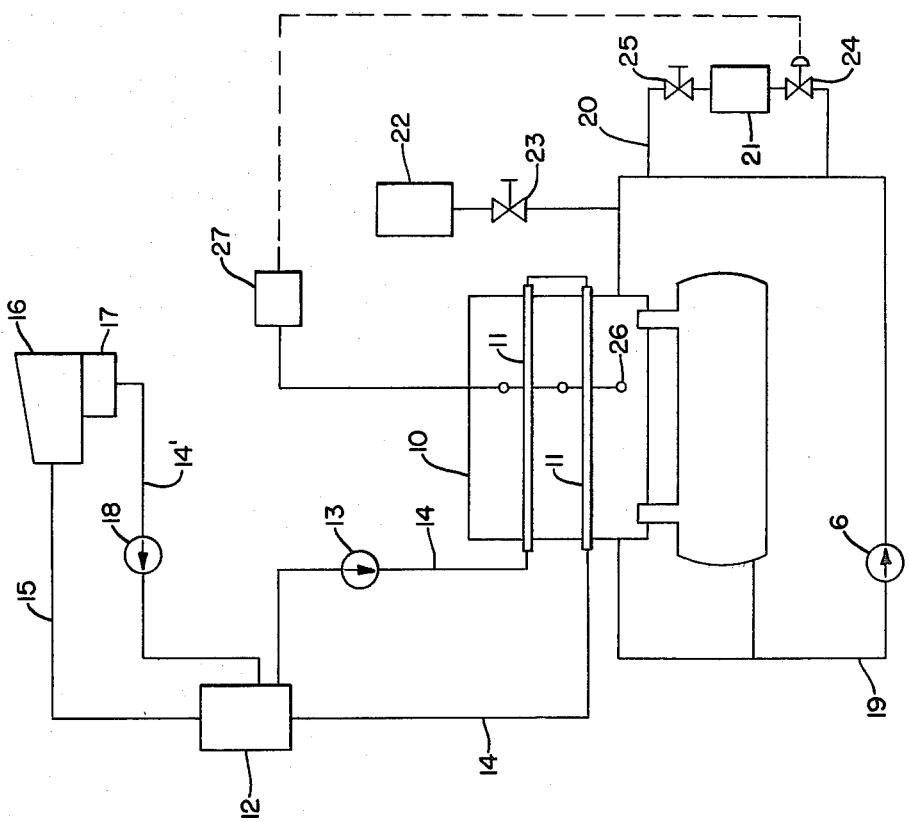
FIG. 11.
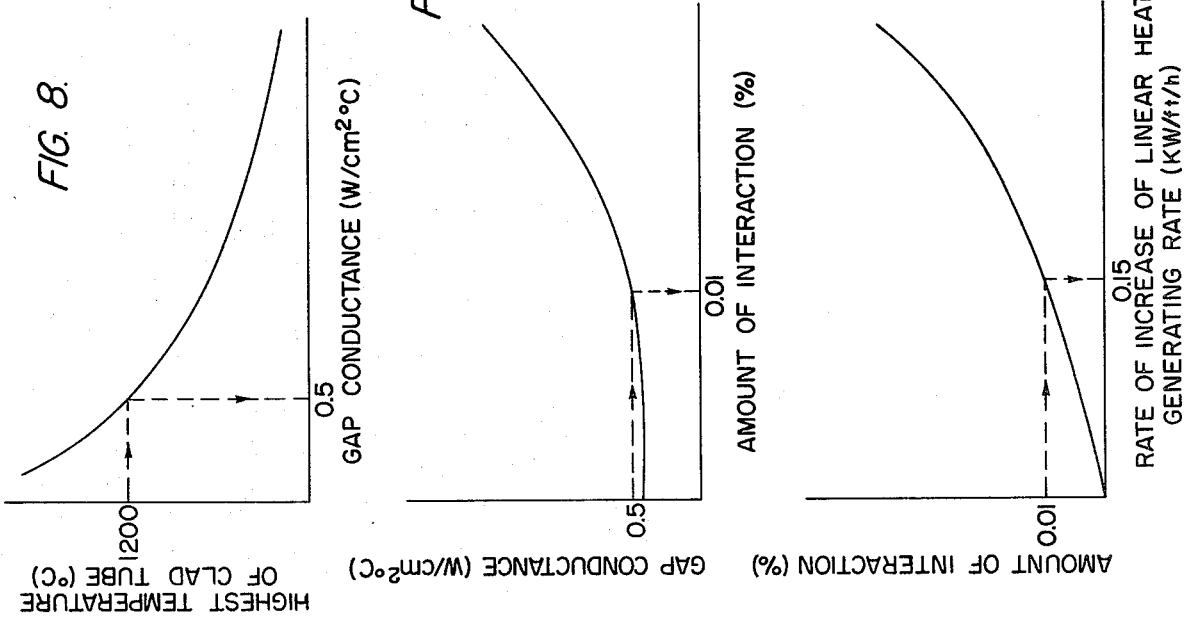
FIG. 8.
FIG. 9.
FIG. 10.

NUCLEAR REACTOR OPERATION CONTROL PROCESS

BACKGROUND OF THE INVENTION

The present invention relates to a method for operating a nuclear reactor to increase nuclear reactor power and especially a method for increasing nuclear reactor power without danger of failure of the fuel rods disposed in a core of a nuclear reactor.

A core of a nuclear reactor is provided with a plurality of fuel rods where each fuel rod is assembled such that a plurality of fuel pellets are packed in a clad tube. A rapid increase of nuclear reactor power causes pellet-clad-mechanical-interaction in a recognized linear heat generating rate range (indicated as PCI in the following description) between the fuel pellets and the clad tube due to volume expansion of the fuel pellets and causing excessive strain in the clad tube. Thus, there is a possibility of a failure of the fuel rod, which means that one or more than one openings, cracks or pin holes appear on the clad tube so that nuclear fission products are relieved into a surrounding coolant from the fuel rod through the openings, cracks or pin holes. Regarding the failure of the fuel rod, it has been proposed, as described in Japanese Published Patent Application No. 50-143,999, and U.S. Pat. No. 4,057,466 to Thompson et al, to restrain the rate of increase of the linear heat generating rate when the linear heat generating rate is increased above the linear heat generating rate at which the PCI begins.

As disclosed in the Thompson et al patent, in order to properly condition the fuel rods so as to avoid PCI failure, the rate of increase of the fuel power or linear heat generating rate within the pellet-cladding interaction range is maintained below a critical rate of increase. The critical rate of increase necessarily requires a long term of at least several days to attain the desired operating power level for the nuclear reactor and the length of time to attain such level cannot be shortened due to the limitation on the rate of increase.

SUMMARY OF THE INVENTION

It is therefore an object of the invention to provide a method for operating a nuclear reactor which overcomes the disadvantages of the prior art by increasing the power to attain the rated power level within a short period of time while also preventing failure of the fuel rods.

In accordance with the present invention, there is provided a method for controlling the operation of a nuclear reactor to increase the reactor power in a range in which pellet-clad-mechanical-interaction occurs comprising the steps of increasing the reactor power from a power level in which pellet-clad-mechanical-interaction begins to take place up to a predetermined power level for the nuclear reactor and controlling the rate of increase of reactor power to a rate no less than 0.15 KW/ft/hr., and no greater than a predetermined critical rate so as to shorten the time necessary to raise the reactor power to the predetermined power level without causing pellet-clad-mechanical-interaction damage of the fuel elements.

BRIEF DESCRIPTION OF THE DRAWINGS

FIG. 7 is a characteristic view showing $P_I$ as a parameter;

FIG. 8 is a characteristic view illustrating the relationship between the gap conductance and the highest temperature of the clad tube;

FIG. 9 is a characteristic view illustrating the relationship between an amount of interaction and the gap conductance;

FIG. 10 is a characteristic view illustrating the relationship between the increase rate of the linear heat generating rate and an amount of interaction; and FIG. 11 is a systematic view of a nuclear reactor system regarding a preferred embodiment of the invention.

DETAILED DESCRIPTION OF THE DRAWINGS

Figure 1:
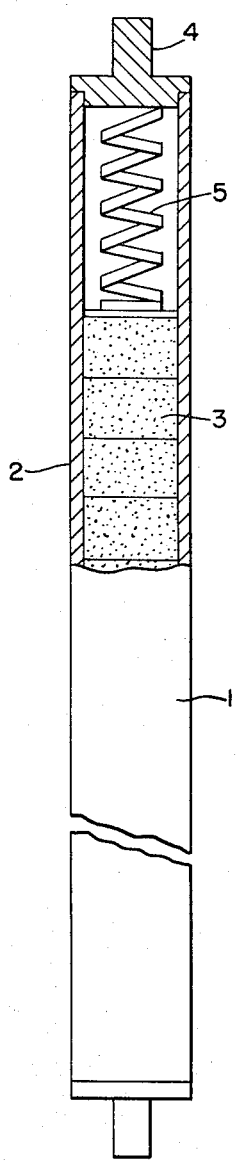
FIG. 1 is a partial sectional view of a fuel rod.

A fuel rod 1 is, as shown in FIG. 1, assembled such that a plurality of fuel pellets 3 are packed in a clad tube 2 with both end portions of the clad tube 2 being sealed by an end plug 4. Further, a spring 5 is disposed in the clad tube 2 to press the fuel pellets 3 downwardly.

Figure 2A:
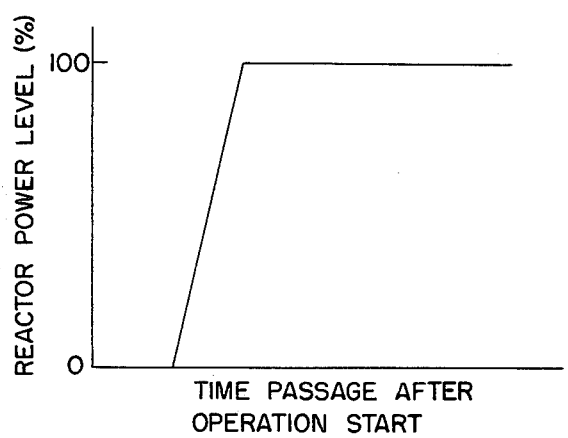
FIGS. 2(a) and 2(b) are characteristic views illustrating the control of reactor power as the time proceeds.

A rapid increase of nuclear reactor power such as in accordance with the pattern shown in FIG. 2(a) causes the PCI between the fuel pellets 3 and the clad tube 2.

Figure 2B:
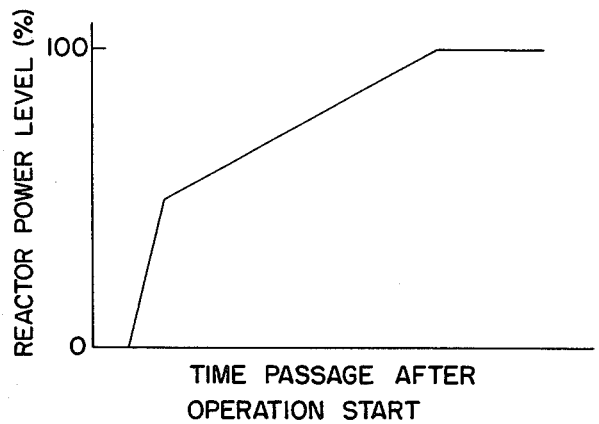

In order to avoid the failure of the fuel rod 1, it has been proposed to restrain the rate of increase of the linear heat generating rate when the linear heat generating rate is increased above the linear heat generating rate at which the PCI begins, as shown in FIG. 2(b).

This invention has been accomplished through a following study. The failure of the fuel rod 1 due to the PCI takes place under the presence of the nuclear fission products such as iodine or cesium accumulated within the fuel rod and there is a large probability of failure when excessive strain appears in the clad tube 2. With the increase of power per a unit length along the fuel rod 1 (indicated as a linear heat generating rate), the temperature of fuel pellets 3 rises. When the value of thermal stress in the fuel pellets is over the breakage stress of fuel pellets 3, the fuel pellets 3 break and simultaneously expand outwardly due to thermal expansion.

The fuel pellets 3 and the inner surface of the clad tube 2 contact each other to cause the PCI between the clad tube 2 and the fuel pellets 3, which results in strain taking place in the clad tube 2. Under this situation with the further increase of the linear heat generating rate of the fuel rod, the strain due to the PCI increases and especially local excessive strain appears in a local portion of the clad tube 2 opposite broken parts of the fuel pellets or opposite interfacing parts of the broken fuel pellets.

Figure 3:
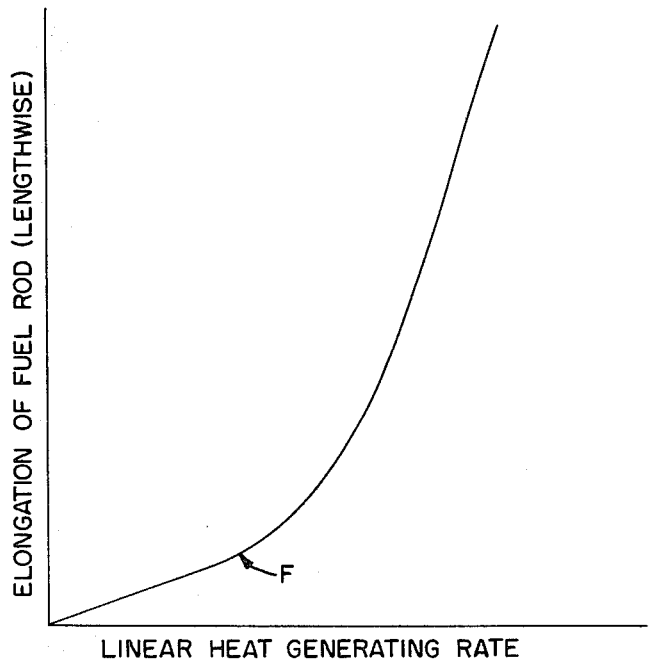
FIG. 3 is a characteristic view illustrating the relationship between the linear heat generating rate and the elongation of the fuel rod.

The deformation of the fuel rod due to the PCI will be explained in detail with reference to FIG. 3. A fuel rod elongates along a curve 6 in FIG. 3 as the linear heat generating rate increases. After an operation of a nuclear reactor begins and until the fuel pellets contact the inner surface of the clad tube, the fuel rod elongates due to only thermal expansion. That is, up to a point F on the curve 6, the fuel pellets are deformed and come in contact with the inner surface of the clad tube due to only thermal expansion. At the point F at which the fuel pellets are deformed and contact the inner surface of the clad tube, the elongation of the fuel rod becomes larger. Under this situation, the elongation of the fuel rod increases greatly as compared with the elongation due solely to thermal expansion and the linear heat generating rate at the point F is the linear heat generating rate at which the PCI begins.

Figure 4:
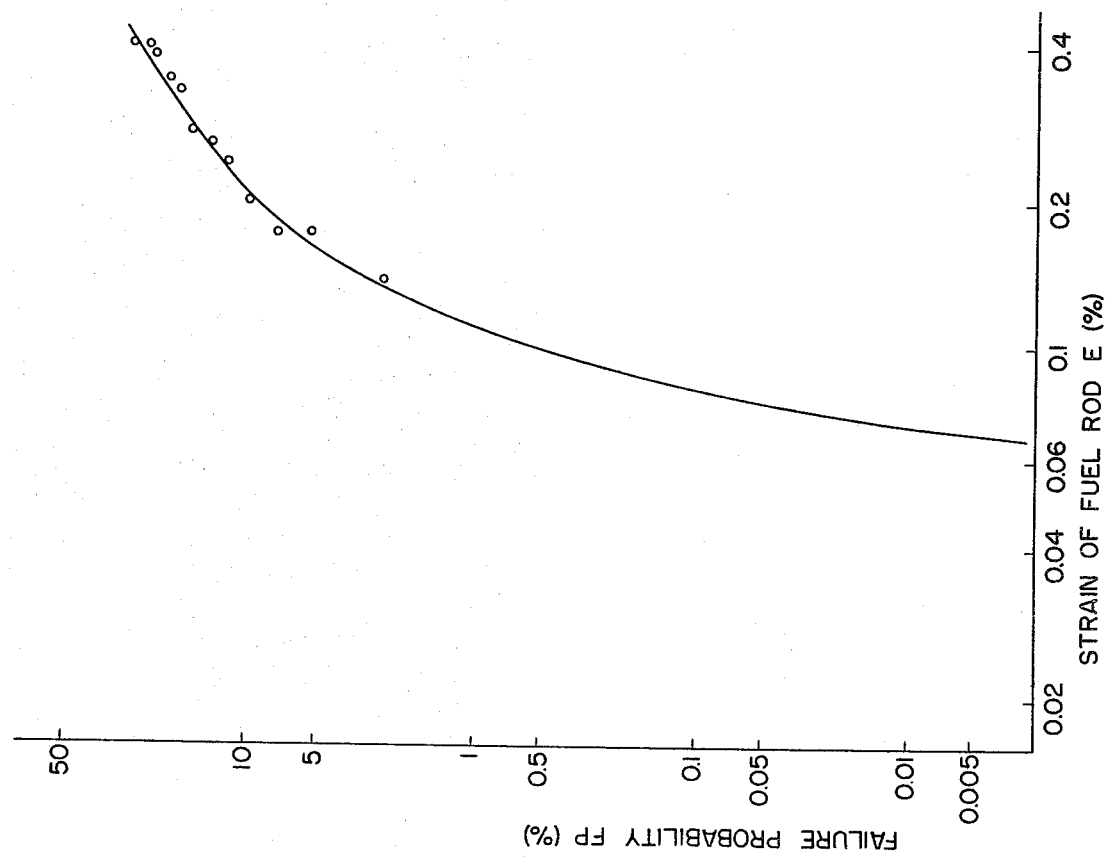
FIG. 4 is a characteristic view illustrating the relationship between the strain of the fuel rod and the failure probability.

The failure of the fuel rod under the pressure of nuclear fission products such as iodine or cesium is known as stress corrosion crack (indicated as SCC). Nuclear fission products sufficient to cause the SCC are accumulated in an amount within the fuel rods which have been used more than about one month in a nuclear reactor. The SCC is predicted in that the probability of occurrence is determined in accordance with the magnitude of strain which appears in the clad tube. The probability of occurrence of the SCC is discussed in the following description. FIG. 4 illustrates the relationship between strain $\epsilon$ of a fuel rod and the probability of the failure, under the condition that the fuel rod 1 is formed of fuel pellets of uranium dioxide and a clad tube 2 of zirconium alloy and was used over 2,000 MWD/T of the rate of combustion and, after that, the nuclear reactor power was rapidly raised up to a high linear heat generating rate, namely, generally 18~22 KW/ft.

The probability of failure was treated by Weibull statistics. As is well known in Weibull statistics, when a probability variable of a phenomenon is expressed by a functional formula of independence variable, the phenomenon is expressed by a probability distribution of the variable.

In FIG. 4, the failure of the fuel rod 1 is described by a probability variable of strain in the clad tube. According to the experimental data in FIG. 4, a failure probability of the fuel rod is expressed by the following formula (1).

$$FP(\epsilon) = 1.0 - \exp(-\exp(Y)) \quad (1)$$

$$Y = aX + b - \exp(-c(X+d))$$

$$X = \ln \epsilon$$

wherein
FP is the failure probability;
$\epsilon$ is strain in a clad tube;
X is $\ln \epsilon$;
Y is $aX + b - \exp(-c(X+d))$; and
a, b, c and d are constants.

Figure 5:
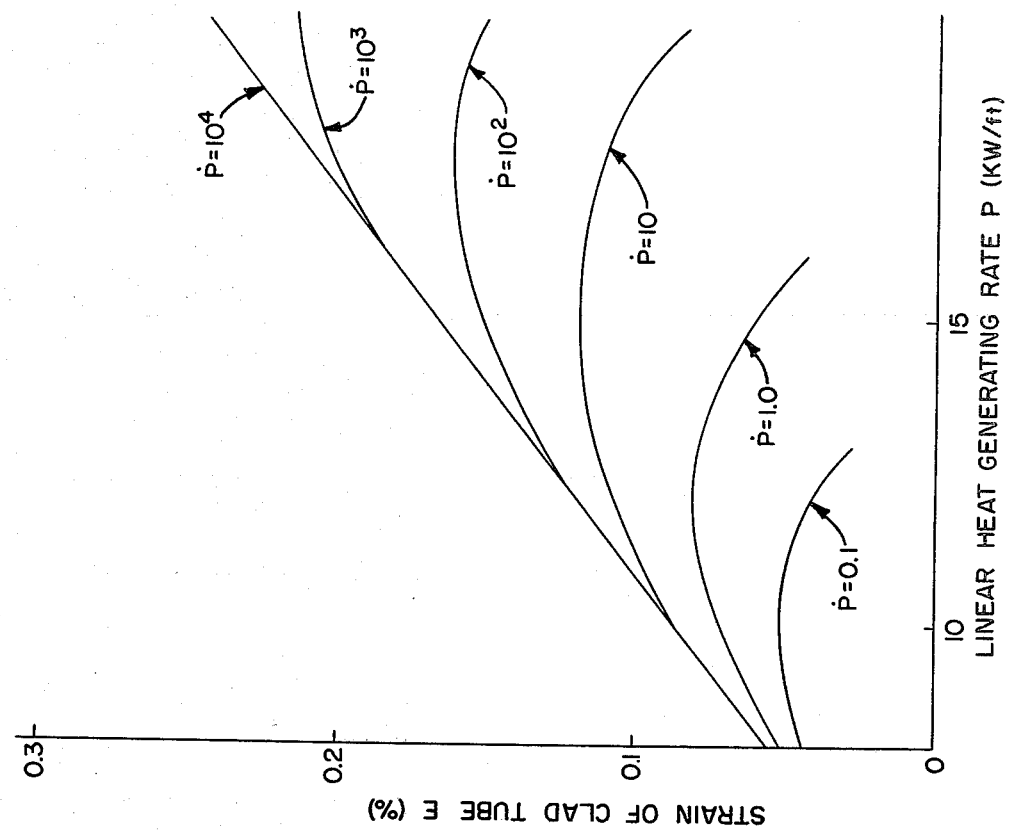
FIG. 5 is a characteristic view illustrating the relationship between the linear heat generating rate and the strain of the clad tube.

Next, the amount of strain in the clad tube 2 is determined in the following manner. FIG. 5 is a graph of experimental data obtained from a measurement of an amount of strain in clad tube 2 while a fuel rod 1, which was formed of fuel pellets of uranium dioxide in a clad tube 2 of ZIRCALOY-2 ®, was irradiated in a reactor. This figure shows a predicted view of strain appearing in the clad tube 2. As apparent from FIG. 5, the strain $\epsilon$ in the clad tube 2 is determined in accordance with the formula (2) concerning a function of linear heat generating rate (P) and an increase rate of a linear heat generating rate ($\dot{P}$).

$$\epsilon(P, \dot{P}, P_I) = \epsilon_1(P, \dot{P}) + \epsilon_2(P, \dot{P}, P_I) \quad (2)$$

$$\epsilon_1(P, \dot{P}) = A_1(T_p - T_o)$$

$$\exp\left[\frac{-C_1 P}{(T_p - T_o)\dot{P}} \left(1 + B_1 \exp\frac{(-Q_1)}{RT_p}\right)\right]$$

$$\epsilon_2(P, \dot{P}, P_I) = A_2(T_p - T_1)$$

$$-B_2\left[\frac{P}{\dot{P}} \exp\frac{(-Q_2)}{RT_p} - \frac{P_I}{\dot{P}} \exp\frac{(-Q_2)}{RT_1}\right]$$

wherein
P is a linear heat generating rate;
$P_I$ is a linear heat generating rate at which the PCI begins;
$\dot{P}$ is the rate of increase of the linear heat generating rate;
$T_p$, $T_I$ and $T_o$ are temperatures at the center of a fuel pellet, respectively, when $P = P$, $P_I$, 0;
$Q_1$ and $Q_2$ are activation energies;
$A_1$ and $A_2$ are constants determined by coefficient $\alpha$ of thermal expansion and smear density Sd;
$B_1$ and $B_2$ are constants determined by Young's modulus of the pellet and smear density Sd; and
$C_1$ is a constant determined by rate of creep $\epsilon$ c of the pellet.

A "no failure" operation of fuel rods is defined such that no failure of any fuel rod resulting from cracks in the fuel rod occurs in the fuel rods located in a core of a nuclear reactor operated in power cycles in which all fuel rods have been used for a couple of years. The determination of no failure operation of fuel rods is indicated by the failure probability as follows. Assume that a number of fuel rods located in a core of a nuclear reactor is M, a number of power operation cycles in a fuel use duration is N, and when the failure probability FP of the fuel rods upon power increase satisfies the following formula (3), no failure operation of fuel rods is accomplished.

$$M \cdot N \cdot FP(\epsilon) < 1 \quad (3)$$

In conventional commercial nuclear reactors, generally $M = 3 \times 10^4$ and $N = 3 \times 10^2$. When these numeric values are substitutes in the formula (3), the formula (3) is changed as follows:

$$FP(\epsilon) < 10^{-7} \quad (3A)$$

If the formula (3A) is satisfied, no failure operation of fuel rods is ensured.

From the function of the formula (1) as shown in FIG. 4 regarding the strain in a clad tube, when $\epsilon \leq 0.06(\%)$, $FP(\epsilon) << 10^{-7}$ is satisfied such that the formula (2) is changed as follows in the conventional commercial nuclear reactors:

$$\epsilon(P, \dot{P}, P_I) = 0.06 \quad (4)$$

If a relationship between the linear heat generating rate (P) and the rate of increase of the linear heat generating rate ($\dot{P}$) which satisfies the formula (4) is obtained, the relationship indicates a condition of no failure operation of fuel rods.

The parameter $P_I$ in the formula (4), which is the linear heat generating rate at which the pellet-clad-mechanical-interaction begins between the fuel pellets and the clad tube, is a value determined by a fuel rod specification and an operation condition of power operation cycles before the power increase.

Now assume that a gap between the fuel pellets and the clad tube 2 is small or the linear heat generating rate of operation cycles before the power increase is maintained at a substantially constant level for a short time, this situation is expressed by $P_I=0$ KW/ft.

As apparent from the formula (2), the above-noted situation represents the worst condition present for occurrence of the failure of fuel rods, which means that the strain in the clad tube is determined to be excessive. Under the condition when the formula (4) is solved, $\dot{P}$ is indicated as follows:

$$\ln \dot{P} = \frac{B}{P-A} + C \cdot P - D \quad (5)$$

wherein A, B, C and D are constants determined by a fuel rod system and a value representing a property of the fuel rod.

A is determined by a coefficient $\alpha$ of thermal expansion of a pellet and smear density Sd; B is determined by Young's modulus E of a pellet and smear density Sd; C is determined by a rate of creep $\epsilon c$ of a pellet; and D is determined by a coefficient $\alpha$ of thermal expansion of a pellet, Young's modulus E and smear density Sd.

The value of $\dot{P}$ determined by the formula (5) is the critical rate of increase of the linear heat generating rate for no failure operation of fuel rods. If a nuclear reactor power is increased at the increase rate of a linear heat generating rate below $\dot{P}$ determined by the formula (5), there is no failure of fuel rods.

When the below-described fuel rod is employed as an example of the fuel rod 1, each constant of the formula (5) is specified so that the formula (6) is obtained.

Fuel: about 90~98% T·D·UO$_2$ pellets and about 90~98 Y·T·DUO$_2$+PuO$_2$ pellet
Clad tube: zirconium alloy
Outside diameter: about 11-20 mm
Thickness of clad tube: about 0.4-0.9 mm
Diameter of fuel pellet: about 10.5-18.8 mm $$\ln \dot{P} = \frac{3.3}{P-8.0} + 0.45P - 6.6 \quad (6)$$

Figure 6:
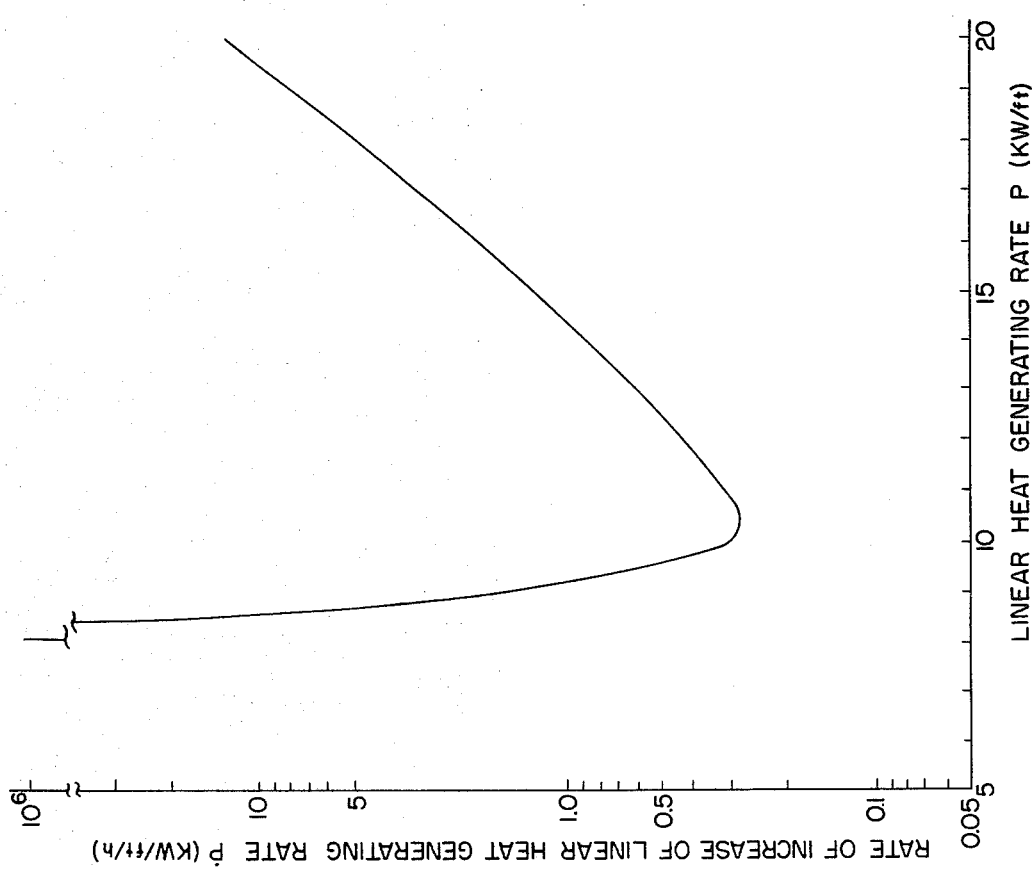

This relationship is illustrated in FIG. 6. It will be understood that when the rate of increase of a linear heat generating rate is maintained below the critical increase rate of the linear heat generating rate given by the formula (6), a no failure operation of the fuel rods is provided.

While the linear heat generating rate has been discussed above with regard to the worst condition in which $P_I=0$ KW/ft., $P_I$ may take other values. For example, it is possible to increase $P_I$ to 2~10 KW/ft. by increasing the gap between the fuel pellets and the clad tube 2 or by increasing the linear heat generating rate before the power increase and by increasing the holding term. At this time, the formula (5) showing the increase rate of the critical linear heat generating rate is changed to the following formula (7):

$$\ln \dot{P} = \frac{B}{P-(A_1+A_2P_I)} + C \cdot P - D_1 + D_2P_I \quad (7)$$

wherein
B and C are constants explained above;

$A_1$ and $A_2$ are constants which are determined by a factor similar to A in the above; and $D_1$ and $D_2$ are constants which are determined by a factor similar to D in the above.

When the numerical values of the same fuel rod discussed above in connection with formula (6) are again employed, the formula (7) is changed to the following formula (8):

$$\ln \dot{P} = \frac{3.3}{P-(8.0+0.5P_I)} + 0.45P - 6.6 + 0.35P_1 \quad (8)$$

Figure 7:
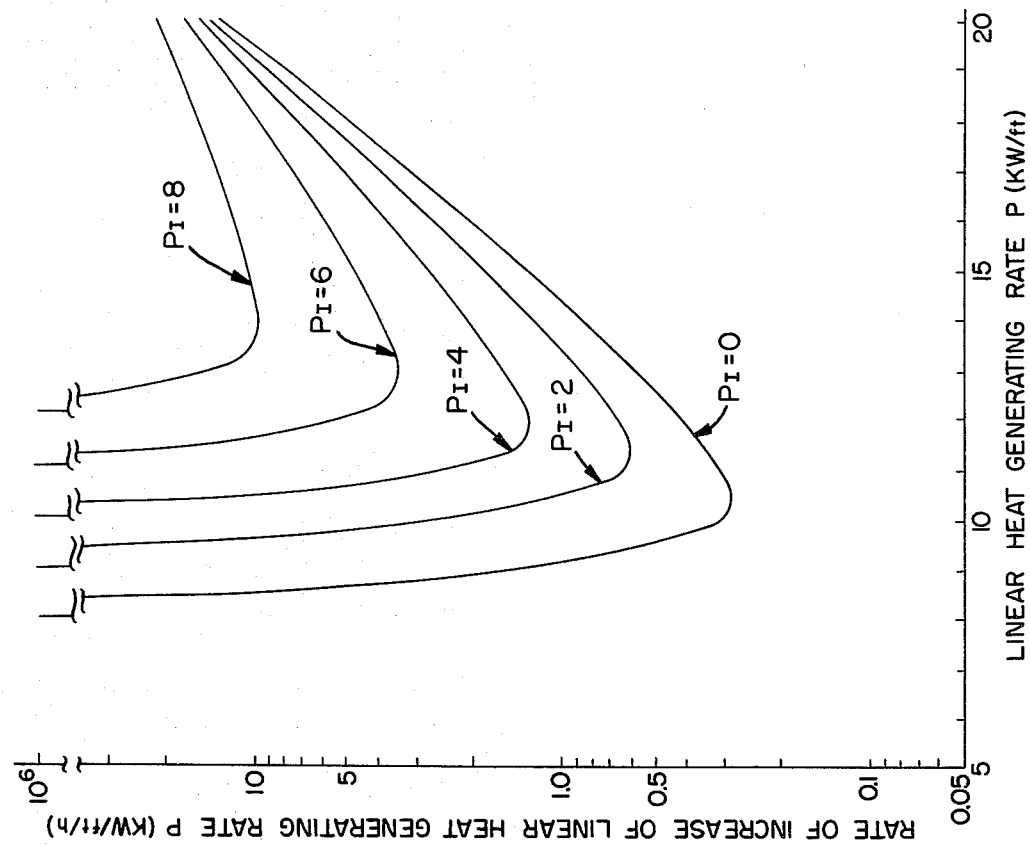
FIGS. 6 and 7 are characteristic views illustrating the linear heat generating rate and the increase rate of the linear heat generating rate, and especially

The critical increase rate $\dot{P}$ of the linear heat generating rate is indicated in FIG. 7 under a parameter $P_I$. It will be understood that, if $P_I$ is increased, the increase rate $\dot{P}$ of the linear heat generating rate is increased. $P_I$ is a constant which is mainly determined by the form of the fuel rod and the value representing a property of the fuel rod. When the reactor power is increased at the increase rate of the linear heat generating rate below $\dot{P}$ determined by the formula (8), the predetermined power level is reached without the failure of the fuel rods.

When the increase rate of an extremely small linear heat generating rate is employed, the fuel pellets and the clad tube come conditioned or fit properly with respect to one another so that the failure of the fuel rods due to the PCI is avoided.

The proper fitting corresponds to the decrease of contact pressure acting between the fuel pellets and the clad tube. The decrease of the contact pressure causes an increase of the heat resistance, namely, the decrease of a gap conductance, between the fuel pellets and the clad tube.

In a nuclear reactor, it is important to prevent the occurrence of the failure of the fuel rods during a normal operation, as well as to remove heat from the fuel rods upon a coolant loss accident in absence of a coolant in a core of the nuclear reactor.

In consideration of the removal of heat upon a loss of coolant accident, it is necessary to keep the gap conductance above a constant value. Thus, in order to avoid the occurrence of fitting more than necessary, the increase rate of the linear heat generating rate must be limited in a suitable extent. FIG. 8 illustrates the relationship between the highest temperature of a clad tube upon the coolant loss accident and the gap conductance in the fuel rod constructed as discussed above.

FIG. 9 illustrates the relationship between the gap conductance and an amount of interaction, and FIG. 10 illustrates the relationship between the amount of interaction and the increase rate of the linear heat generating rate.

When the temperature of the clad tube exceeds about 1,200° C., the clad tube and the cooling water chemically react so that the strength of the clad tube decreases extremely. Upon a loss of coolant accident, the highest temperature of the clad tube must be restricted at all times under about 1,200° C. The gap conductance corresponding to about 1,200° C. of the highest temperature of the clad tube is about 0.5 W/cm$^2$°C., as apparent from FIG. 8. It is apparent that an amount of interaction corresponding to the above gap conductance is about 0.001% from FIG. 9. Furthermore, the increase rate of the linear heat generating rate is about 0.15 KW/ft/hr. from FIG. 10, corresponding to the above amount of interaction.

Accordingly, in order to satisfy the restricted value of the highest temperature of the clad tube upon the loss of coolant accident, as well as to prevent the failure of the fuel rods upon the loss of coolant accident, it is necessary to hold the increase rate of the linear heat generating rate above 0.15 KW/ft/hr.

Referring to FIG. 11, a preferred embodiment of the invention will be described. Fuel assemblies formed from fuel rods as shown in FIG. 1 are disposed in pressure tubes 11 passing through a calandria tank 10 which contains the $D_2O$, heavy water moderator. A first coolant conduit 14 connects the pressure tubes 11, a steam generator 12 and a circulation pump 13. The $D_2O$ coolant flows in the conduit 14 and serves for cooling the fuel assemblies. Light water is supplied to the stream generator 12 through the coolant conduit 14'. The light water vaporizes in the steam generator 12 and the resultant steam is sent to a turbine 16 through a steam conduit 15. The steam exhausted from the turbine 16 is condensed in a condenser 17 and the condensed water is again supplied to the steam generator 12 through the conduit 14. A pump 18 is disposed in the coolant conduit 14'. Liquid poison is intermixed with the $D_2O$ in the calandria tank 10. The $D_2O$ is circulated in a heavy water circulating conduit 19 of which both ends are connected to the calandria tank 10. Both ends of a conduit 20 coupled with a poison remover 21 are connected to the heavy water circulating conduit 19. A poison solution reservoir 22 is connected to the heavy water circulating conduit 19 through a valve 23. Valves 24 and 25 are disposed in the conduit 20 with the poison remover 21 being disposed therebetween. When the valves 24 and 25 are open, the $D_2O$ is sent to the poison remover 21 and the liquid poison in the $D_2O$ is removed. The removing of the liquid poison in the $D_2O$ serves for increasing the reactor power and, when the valve 23 is open, the liquid poison is supplied from the poison reservoir 22 to the $D_2O$ such that the reactor power decreases. Further, at least one neutron flux detector 26 is provided for measuring neutron flux in the core and the flux magnitude is transmitted to control equipment 27 for control purposes.

The following description provides an example of the operation of the nuclear reactor shown in FIG. 11 for increasing the power of the reactor.

The valve 23 is closed and the valves 24 and 25 are open to supply the $D_2O$ to the poison remover 21. The liquid poison in the $D_2O$ is removed and the reactor power increases. The neutron flux in the core of the nuclear reactor is detected by the neutron flux detector 26 and the measured values are transmitted to the control equipment 27 for calculating a linear heat generating rate P according to the measured values with the increase rate of the linear heat generating rate P being obtained based on momentary changes of the linear heat generating rate $\dot{P}$. To the extent that the linear heat generating rate P is lower than $P = 8.0 + 0.5\ P_I$, when the obtained increase rate P of the linear heat generating rate is over 0.15 KW/ft/hr., the condition is held. However, when the rate of increase is below 0.15 KW/ft/hr., the valve 24 is opened and an amount of $D_2O$ flowing to the poison remover 21 increases with the removal of poison increasing so that the increase rate of the linear heat generating rate $\dot{P}$ is adjusted to be no less than 0.15 KW/ft/hr. In the extent of $P \geq 8.0 + 0.5\ P_I$, the amount of $D_2O$ flowing to the poison remover 21 is adjusted by the operation of the valve 24 so that the increase rate of the linear heat generating rate is maintained to be no less than 0.15 KW/ft/hr. and satisfies the formula:

$$\ln \dot{P} \leq \frac{3.3}{P - (8.0 + 0.5 P_I)} + 0.45P - 6.6 + 0.35 P_I$$

The valve 24 is adjusted by the control equipment 27 such that, in a case of $P_I = 0$ and $P < 8.0$, the increase rate of the linear heat generating rate is at least 0.15 KW/ft/hr. and, when $P \geq 8.0$, the increase rate of the linear heat generating rate is at least 0.15 KW/ft/hr. and below $\dot{P}$ determined by the formula (6).

According to the present invention, the failure of the fuel rods due to the PCI and a loss of coolant accident is prevented while the time required for increasing the reactor power to the predetermined power level can be shortened. Moreover, the present invention is applicable to a boiling water reactor (BWR), as well as a pressured water reactor (PWR). In a BWR, the increase rate of the linear heat generating rate can be adjusted in the predetermined extent by the control of an amount of coolant flowing to a core of the reactor, whereas in a PWR, the increase rate is adjusted in the predetermined extent by the control of the consistency of liquid poison included in the coolant.

I claim:

1. A method for controlling the operation of a nuclear reactor to at least initially increase the reactor power in a range in which pellet-clad-mechanical-interaction occurs comprising the steps of at least initially increasing the reactor power from a power level in which pellet-clad-mechanical-interaction begins to take place up to a predetermined power level for the nuclear reactor and controlling the rate of increase of the linear heat generating rate to a rate no less than 0.15 KW/ft/hr., and no greater than a predetermined critical rate so as to shorten the time necessary to at least initially raise the reactor power to the predetermined power level without causing pellet-clad-mechanical-interation damage of the fuel elements.

2. A method for controlling the operation of a nuclear reactor to increase the reactor power in a range in which pellet-clad-mechanical-interaction occurs comprising the steps of at least initially increasing the reactor power from a power level in which pellet-clad-mechanical-interaction begins to take place up to a predetermined power level for the reactor and controlling the rate of increase of the linear heat generating rate P so as to be no less than 0.15 KW/ft/hr. and no greater than a critical rate determined in accordance with the equation $$\ln \dot{P} = \frac{B}{P - A} + C \cdot P - D$$

during at least the initial increase of the reactor power from the power level in which pellet-clad-mechanical-interaction begins to take place up to the predetermined power level for the reactor, wherein:

P: linear heat generating rate (KW/ft);

$\dot{P}$: rate of increase of the linear heat generating rate (KW/ft/hr);

A: numeral determined by a coefficient $\alpha$ of thermal expansion of a pellet and smear density;

B: a constant determined by Young's modulus of a pellet and smear density;

C: a constant determined by a rate of creep of a pellet; and

D: a constant determined by a coefficient α of thermal expansion of a pellet, Young's modulus and smear density.

3. A method according to claim 2, wherein A is (8.0+0.5 $P_I$), B is 3.3, C is 0.45 and D is (6.6−0.35 $P_I$).

4. A method according to claim 2, wherein A is 8.0, B is 3.3, C is 0.45, D is 6.6, and $P_I$ is 0.

5. A method according to claim 2, 3 or 4, wherein the rate of increase of the linear heat generating rate P is controlled by the adjustment of the amount of heavy water through a core of the nuclear reactor.

6. A method according to claim 2, 3 or 4, wherein the rate of increase of the linear heat generating rate P is controlled by the adjustment of the amount of coolant through a core of the nuclear reactor.

7. A method according to claim 2, 3 or 4, wherein the rate of increase of the linear heat generating rate P is controlled by the adjustment of the consistency of liquid poison included in a coolant.

8. A method for controlling the operation of a nuclear reactor to increase the reactor power in a range in which pellet-clad-mechanical-interaction occurs comprising the steps of at least initially increasing the reactor power from a power level in which pellet-clad-mechanical-interaction begins to take place up to a predetermined power level for the nuclear reactor and controlling the rate P of increase of the linear heat generating rate during at least the initial means of reactor power to a rate no less than 0.15 KW/ft/hr. and no greater than a critical rate determined in accordance with the equation:

$$\ln \dot{P} = \frac{3.3}{P - 8.0} + 0.45P - 6.6$$

wherein P is a linear heat generating rate of no less than 8 KW/ft and no greater than about 20 KW/ft and the pellet-clad-mechanical-interaction begins at a linear heat generating rate no less than 2 KW/ft and no greater than 10 KW/ft.

9. A method for controlling the operation of a nuclear reactor wherein a fuel consists of a plurality of cylindrical pellets of fuel in oxide form of about 10.4–18.8 mm in diameter contained in a plurality of elongated zirconium alloy cladded tubular fuel elements with a cladding thickness of about 0.4–0.9 mm and an outside diameter of about 11–20 mm, to at least initially increase the reactor power in a range in which pellet-clad-mechanical-interaction occurs comprising the steps of at least initially increasing the reactor power from a power level in which pellet-clad-mechanical-interaction begins to take place up to a predetermined power level for the nuclear reactor and controlling the rate P of increase of the linear heat generating rate during at least the initial power increase to a rate no less than 0.15 KW/ft/hr. and no greater than a critical rate determined in accordance with the equation:

$$\ln \dot{P} = \frac{3.3}{P - 8.0} + 0.45P - 6.6$$

wherein P is a linear heat generating rate of no less than 8 KW/ft and no greater than about 20 KW/ft and the pellet-clad-mechanical-interaction begins at a linear heat generating rate no less than 2 KW/ft and no greater than 10 KW/ft.

10. A method for controlling the operation of a nuclear reactor wherein a fuel consists of a plurality of cylindrical pellets of fuel in oxide form of about 10.4–18.8 mm in diameter contained in a plurality of elongated zirconium alloy cladded tubular fuel elements with a cladding thickness of about 0.4–0.9 mm and an outside diameter of about 11–20 mm, to at least initially increase the reactor power in a range in which pellet-clad-mechanical-interaction begins to take place up to a predetermined power level for the nuclear reactor and controlling the rate P of increase of the linear heat generating rate during at least the initial power increase to a rate no less than 0.15 KW/ft/hr. and no greater than a critical rate determined in accordance with the equation:

$$\ln P = \frac{3.3}{P - 8.0} + 0.45P - 6.6$$

wherein P is a linear heat generating rate no less than 10 KW/ft and no greater than about 20 KW/ft and the pellet-clad-mechanical-interaction begins at a linear heat generating rate no less than 4 KW/ft and no greater than 6 KW/ft.

11. A method according to claim 8, 9 or 10, wherein the rate of increase of the linear heat generating rate P is controlled by the adjustment of the consistency of liquid poison included in a coolant.

* * * * *